United States Patent [19]

Lindelöw

[11] 4,070,047

[45] Jan. 24, 1978

[54] DEVICE FOR THE UNWINDING AND WINDING UP OF A WEB ROLL

[76] Inventor: Björn Tage Lindelöw, Korshammarsvagen 8384, 430 41 Kullavik, Sweden

[21] Appl. No.: 683,491

[22] Filed: May 5, 1976

[51] Int. Cl.² ............................................ B65H 17/08
[52] U.S. Cl. .................................................... 242/66
[58] Field of Search ...................... 242/66, 65, DIG. 3

[56] References Cited

U.S. PATENT DOCUMENTS

| | | |
|---|---|---|
| 3,164,332 | 1/1965 | Walker .................................. 242/66 |
| 3,373,952 | 3/1968 | Klaczkiewicz ........................ 242/66 |
| 3,408,018 | 10/1968 | Best ....................................... 242/66 |

Primary Examiner—Edward J. McCarthy

[57] ABSTRACT

A device for unwinding and rewinding a background web roll for photographing purposes and comprising pairs of support rollers which are rotatable about parallel axles and journaled in axially interspaced holders common for each pair of said support rollers, at least one of said holders being U-shaped and being provided with U-leg portions having an interspace between them exceeding the diameter of said web roll in order to allow extension of the web roll through said holder.

4 Claims, 5 Drawing Figures

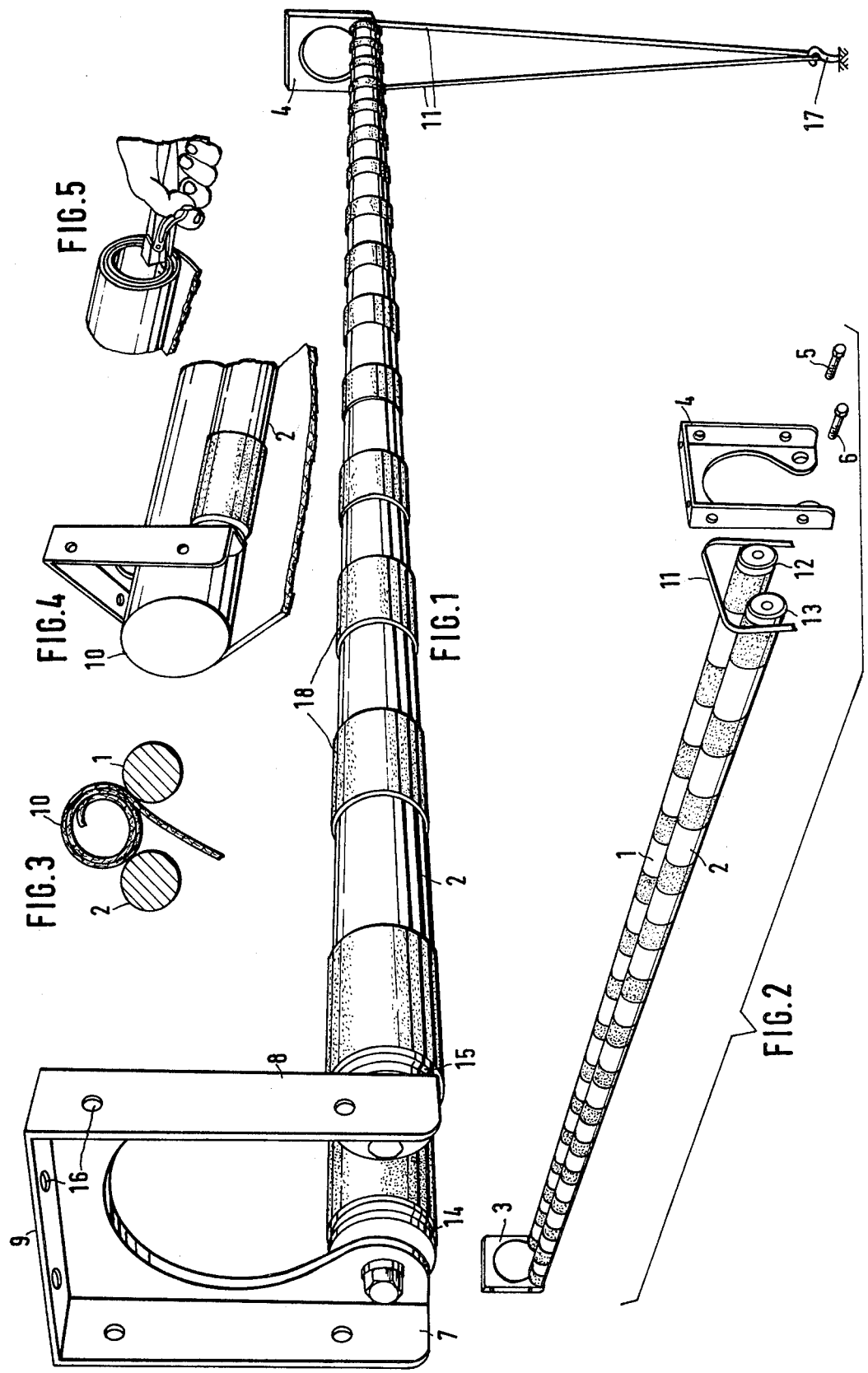

DEVICE FOR THE UNWINDING AND WINDING UP OF A WEB ROLL

The present invention relates to a device for unwinding and rewinding a background web roll for photographing purpose and comprising pairs of support rollers which are rotatable about parallel axles and journaled in axially interspaced holders common for each pair of said support rollers.

Devices of this kind permit a rapid convenient handling of and change between the many different background items, which are required in a photographic studio, and therefore have got a widespread use. One usually uses webs of a width of approximately 272 cm. However, webs of a width of about 360 cm are also in use in such cases, where the usual width is not sufficient. As for a roller of this wider material there is no room between the holding devices of the cylinders of a device for the narrower material according to the type described in the first section, one has used more primitive means for the suspension of the wider material, which primitive means, however, result awkward and time consuming in use. One has therefore also made devices of the type mentioned in the first section exhibiting a roller length, which is sufficient for webs of the greater width. However, in many cases it is difficult or impossible to provide room for a device of a greater cylinder length.

In the new device according to the invention at least one of the holding devices exhibit a reversed U-shape, the cylinders being journaled each one at the lower end of its U-leg, and the distance between the legs in the lower portion being at least as great as the distance between the cylinders and for the rest being sufficiently large to provide room for a roller projecting between the legs and resting upon the cylinders.

An example of an embodiment is illustrated in the accompanying drawing, in which FIG. 1 is a perspective view of the device.

FIG. 2 is another perspective view of the device.

FIG. 3 shows a cross-sectional view through the two cylinders forming part of the device and a roller resting upon them.

FIG. 4 is a perspective view of one end of the device according to the invention and a roller resting upon the same, but of a greater length than the length of the cylinders, and FIG. 5 is a perspective view illustrating a practical measure in connection with the use of the device according to the invention.

The device is provided with two cylinders 1,2, which at both ends are journaled in a holding means 3 and 4 respectively, common for the two cylinders, by means of bolts 5,6. The two holding means 3 and 4 are of identical design and have the shape of an inverted U with two legs 7,8 (FIG. 1) connected to a yoke 9. The cylinders are journaled in the lower end portion of each one of the legs. The distance between the legs in their lower portions is somewhat greater than the distance between the cylinders, and for the rest it is sufficient to provide room for a roller 10 (see FIG. 4) projecting between the legs and resting upon the cylinders. The distance between the cylinders is dimensioned in such a manner that a roller of material placed on the cylinders is resting in a stable manner. The cylinders at one end are provided with a common driving means comprising an endless cord 11 made of leather or plastics, which cord slides over a cord pulley 12,13 on each cylinder. The cylinders also at their other end are provided with identical cord pulleys 14,15 so that the driving cord 11 can be applied at that one end of the device, which according to the circumstances is the most convenient one.

The holding means 3,4 are provided with holes 16 for fastening screws in both the legs as well as in the yoke in order to permit mounting either in the roof or on a wall or on any other vertical surface.

The driving cord 11 is in its lower portion stretched over a hook 17, which functions as a brake for the cylinders in order to prevent that the weight of the web material hanging down from the roller resting upon the cylinders brings the cylinders into a rotating movement. In order to prevent dragging between the roller and the cylinders the latter ones are suitably provided with a friction coating, which in the example of embodiment comprises a number of annular zones 18 of rubber interspaced along the cylinder.

The roller 10 with material resting upon the cylinders can possibly be provided with a carcass in the form of a cylinder of paper board or similar. If such a carcass is not used, it is suitable at the ends of the roller to stitch together the innermost turn as hinted in FIG. 5.

If so desired the device can be designed for motion by motor, by way of example by the driving cord 11 being laid over a driving pulley on a motor shaft instead of over the hook 17. In another advantageous embodiment the cylinders are driven each one by its synchronous motor, which is mounted coaxially to the cylinder. This embodiment has the advantage that the roller resting upon the cylinders unobstructedly can project also at the one end of the holding means, where the driving means is mounted.

I claim:

1. A device for unwinding and rewinding a background web roll for photographing purposes and comprising pairs of support rollers which are rotatable about parallel axles and journaled in axially interspaced holders common for each pair of said support rollers, at least one of said holders being U-shaped and being provided with U-leg portions having an interspace between them exceeding the diameter of said web roll in order to allow extension of the web roll through said holder.

2. A device according to claim 1, characterized by the U-shape of the holder being reversed, i.e. said holder having downwards directed legs each one supporting one support roller of said roller pair.

3. A device according to claim 2, characterized by the distance between the lower portions of said legs being at least as great as the interspace between the support rollers giving a free passage way for a web of a web roll extending through the holder.

4. A device according to claim 1, characterized by said support rollers extending between said axially interspaced holders and at least at one end the holders being provided with a driving means for rotating the rollers.

* * * * *